Patented Oct. 8, 1929

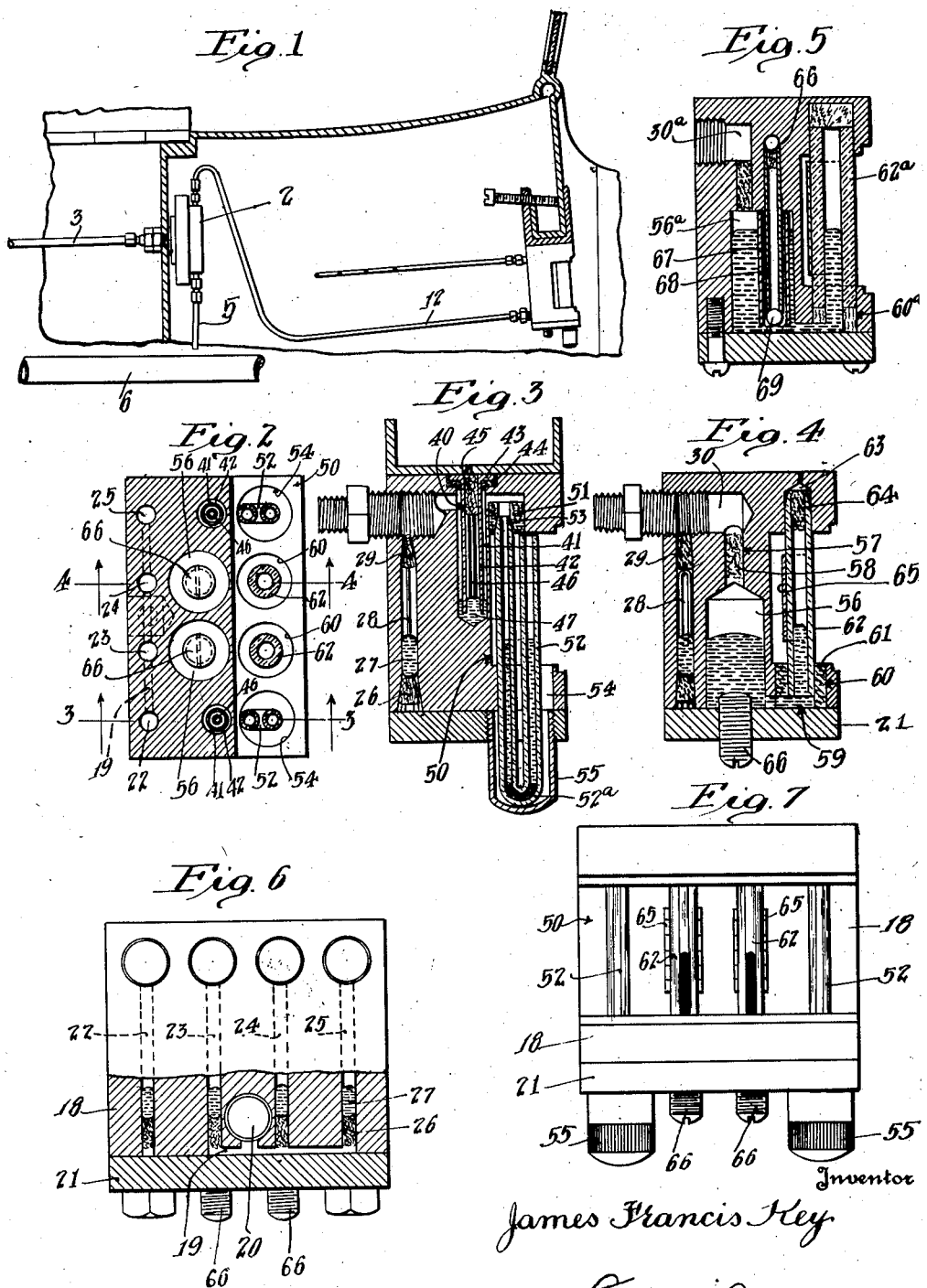

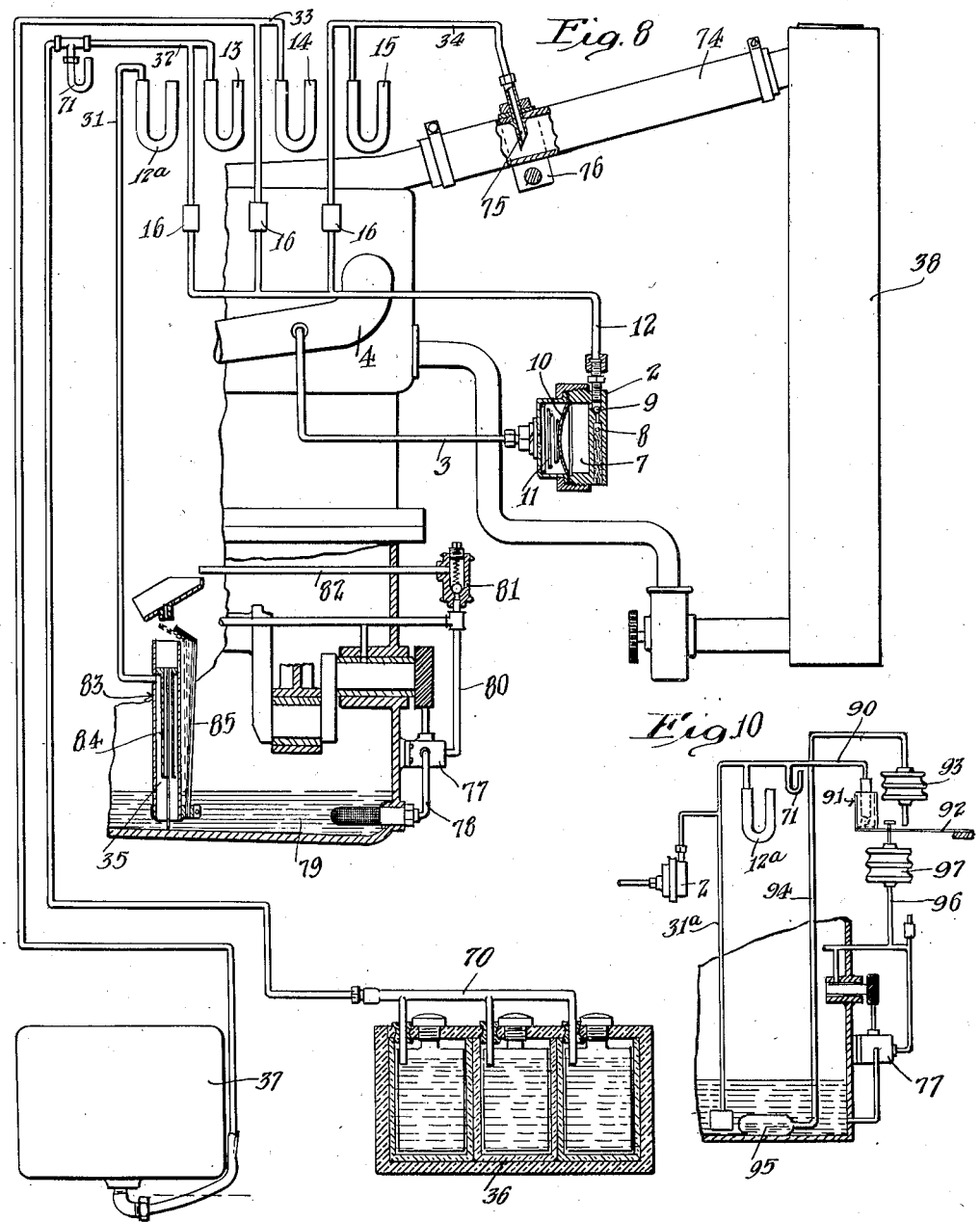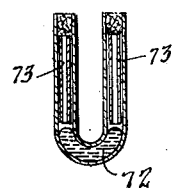

1,730,734

UNITED STATES PATENT OFFICE

JAMES FRANCIS KEY, OF SIERRA MADRE, CALIFORNIA, ASSIGNOR TO FIRST TRUST & SAVINGS BANK OF PASADENA, TRUSTEE, OF PASADENA, CALIFORNIA

MEANS FOR INDICATING CONDITIONS OF LIQUIDS EMPLOYED IN INTERNAL-COMBUSTION ENGINES

Application filed October 8, 1928. Serial No. 310,940.

The present invention relates to apparatuses and devices for indicating the conditions of different liquids, such as, oil, water, gas and acid which are used in internal combustion engines.

The general object of the present invention is to provide a system by which the various liquids employed in an internal combustion engine may be measured and also to provide a means by which other factors concerning such liquids may be indicated, such as, temperature, viscosity, etc.

A further object of the present invention is to provide means by which a gas, such as air, may be employed as the connecting means between the liquid supplies to be measured and the indicating instruments or gauges, so that the system is independent of mechanical inaccuracies which result from the use of floats, wires, levers, etc.

More particularly, an object of the present invention is to provide a system operating with air as a connecting medium with novel forms of relief and check valves for regulating the pressure in the system, to provide means for heating the gas used in the system and to provide mechanical features of construction which facilitate assembling of the apparatus, further to provide means which will compensate for movement of the liquid being measured.

A further object of the present invention is to provide a means by which an excessive temperature or insufficient viscosity of the fluid being measured will cause it to give an indication in an indicating member of the system.

Various further objects and advantages of the present invention will be apparent from a description of a preferred form or forms of apparatus embodying the invention. For this purpose, there is hereafter described, with references to the accompanying drawings, the preferred forms of the invention.

In the drawings:

Figure 1 is a fragmentary view of a motor vehicle partially in elevation showing the arrangement of a gas pressure developing means or pump and the indicating elements of the system or gauge.

Figure 2 is a horizontal section of the gauge taken on the line 2—2 of Figure 3.

Figure 3 is an elevation in section of the gauge taken on line 3—3 of Figure 2.

Figure 4 is a further elevation in section of the gauge taken on the line 4—4 of Figure 2.

Figure 5 is a similar view showing a slightly modified form of gauge.

Figure 6 is a back view of the gauge shown in Figures 1 to 3 inclusive, the figure being partially in vertical section.

Figure 7 is a front elevation of the gauge shown in Figures 1 to 7 inclusive.

Figure 8 is a somewhat diagrammatic elevation of an internal combustion engine showing connections between the supply systems and the pump engine and gauges of the system.

Figure 9 is an elevation in section of the relief valve shown in Figure 8, and

Figure 10 is a diagrammatic elevation of part of a modified system.

Referring to the drawings, the system comprises a means 2 for developing gas such as air under pressure. In this case, the means is indicated as in the form of a diaphragm pump which has a line 3 leading to the intake 4 (Figure 8) of an internal combustion engine, so that the regulations of pressure in the intake manifold of the engine cause the actuation of the pump. The pump 2 has an air inlet line 5 which leads to a point slightly over the exhaust pipe 6 of the internal combustion engine so that it draws into the system air slightly heated by the exhaust pipe 6. By employing slightly heated air, condensation of moisture in the system is reduced and the system, therefore, caused to operate with greater accuracy.

The diaphragm pump 2 is illustrated in Figure 8 and comprises a diaphragm chamber 7 having an intake port 8 controlled by a check valve 9. The intake port 8, in practice, connects with the line 5. Within the diaphragm chamber 7, there is mounted a diaphragm 10 normally held to the right by a spring 11 and adapted to be drawn to the left by suction from the line 3.

From the diaphragm chamber 7, an air discharge line 12 leads to a number of indicating elements or gauges 13, 14 and 15 through check valves 16. The check valves and gauges are preferably mounted within a single gauge housing 18 which is illustrated in detail in Figures 2, 3, 4, 6 and 7. Referring to figures, the gauge housing comprises a body member 18 which has a groove 19 on its bottom face near the rear of the gauge which provides a means by which the gas from the pump line 12 may be distributed to the different gauges or indicating columns of the gauge housing. 20 indicates an opening in the rear face of the body member 18 by which the line 12 may be connected to the gauge housing, said opening communicating with the distributing duct 19. A bottom plate 21 is attached to the bottom of the body 18 and forms the groove 19 into a closed passage.

The passage 19 connects with the vertical bores 23, 24 and 25, but not bore 22. Each of the vertical bores 22, 23, 24 and 25 is provided with means by which the bores may serve as check valves, permitting the passage of gas upwardly by preventing the return passage of gas. As shown in Figures 3, 4 and 6, these check valves are formed by the provision of a porous material 26, such as cotton, at the bottom of the bores upon which is placed a drop of mercury 27. Due to the surface tension of the mercury, it will not pass the porous bodies 26 and when permitted to drop thereagainst, seals the bores against the downward passage of gas.

Above the porous members 26, there is provided a means for making the upper portion of the bores having an irregular cross section, open for the passage of the drops of mercury 27. The bores might be initially formed in an irregular cross section, having a narrow side groove if desired, but the simplest form of construction is to provide near one side of the bores, a wire 28 which may be a single wire or bent into U-shape, as indicated in Figure 4. When such a wire is provided in the bores, the mercury, when it travels up along the wires 28, due to its capillary action, pulls away from the wall adjacent the wire and permits the passage of air by the mercury. In the tops of the bores there are provided further bodies of porous material 29 to limit the upward travel of the mercury drops 27.

The tops of the bores 22 to 25 inclusive each communicate with horizontal bores 30 in the body of the housing which are open to the rear and preferably threaded so that the rear of the bores may be connected to lines 31, 32, 33 and 34 (see Figure 8) leading to the liquids of the internal combustion engine, the conditions of which are to be indicated by the gauges included within the gauge housing. The line 31 is shown as connected with the oil system 35 of the engine, the line 32 with a battery 36, the line 33 with a gasoline supply tank 37, and the line 34 with a water cooling system 38.

The gauges 12ª and 13 connect with the bores 22 and 25, respectively, and are of similar construction, while the gauges 15 and 14 connect with the bores 23 and 24, respectively, and are of similar construction. Considering first, the gauges 12ª and 13, as shown in Figure 3, these gauges communicate with the bores 30 through relief valves 40 which are formed in the body 18 by downward bores 41, in which are positioned tubes 42 having flanges 43 by which they are supported at the tops of the bores on packing 44. The tubes 42 terminate slightly above the bottom of the bores 41 and are of a somewhat smaller external diameter than the internal diameter of the bore 41. The bores of the tube 42 are closed at their upper end by a body of porous material 45, such as cotton, which engages the upper end at a further tube 46 which may be of any material, including paper. The tubes 46 are slightly smaller in external diameter than the internal diameter of the tubes 42. At the bottom of the bore 41 there is provided a small body 47 of mercury.

The check valve thus described operates as follows: Whenever there is developed a gas pressure within the bore 30, the small body of mercury 47 is pushed down the bore 41 and forced to rise upwardly in the internal bore of the tube 42. The capillary action or surface tension of the body of mercury causes the entire body of mercury, in rising up the tube 42, to rise inside of the inner tube 46, leaving between it and the inner walls of the tube 42, a small annular air passage.

When the pressure in the bore 30 is sufficient to cause the mercury to rise in the tube 46 until this annular air passage is open, then the air will pass up to the end of the passage and by the body of porous material, and escape.

Beyond the valve 40 thus described, bore 30 has a downward extension communicating with a large horizontal groove 50 in the body 18 of the gauge housing. Within this groove 50, there is positioned the portions of the gauges which are intended to be visible. The downward portion of the body 30 is provided with a hollow body 51 of elastic packing material, such as cork, and into the bore of said body 51 is pressed the upper end of the rear leg of a U-tube 52 composed of glass, or other suitable transparent material. The upper end of the rear leg of said U-tube is tapered, as indicated at 53, so that it may be readily forced into the body of packing material 51. The body 18 is indicated as having an opening 54 in its bottom through which the U-tube 52 may be forced. There is also indicated an aligning opening in the base plate 21 and to said base plate 21 is screwed a cap 55 which engages the bottom of the U-tube 52, and thus provides a means for forcing said U-tube into position. The construction thus described provides a convenient means for pressing the U-tubes into position, and holding the same in position within the gauge housing. The U-tubes 52 are filled in their lower parts with oil which is thus adapted to move upwardly in the front leg of the U-tubes to indicate pressure imposed thereon. A body 52ª of porous material such as cotton is positioned in the bottom of the U-tube 52 which acts to retain the oil in the tube under moderate gas pressures. The relief valves in bores 41 are adjusted so that a pressure cannot be imposed on the oil in tubes 52 sufficiently to overcome the capillary action of the cotton and blow the oil from the tubes.

Now referring to Figure 4, the gauges 15 and 14 are shown as formed by enlarged bores 56 from the bottom of the body 18 which connect by reduced bores 57, with the corresponding passages 30. These reduced bores 57 are filled with porous material 58 to prevent loss of mercury. At the bottoms of the body 18 there are provided short, forward grooves 59 which, together with the base plate 21, form closed passageways connecting the bores 57 with the vertical bores 60 near the front of the body. Said vertical bores 60 are provided with hollow packing cork 61 receiving the lower end of transparent tubes 62 which extend up into vertical bores 63 in the body. The tubes 62 are closed at their upper ends by bodies of porous material 64. There are thereby constructed U-tubes, the rear legs of which are considerably larger in diameter than the front legs, so that practically all of the displacement of the mercury is caused to take place in the front visible legs of the U-tubes. 65 indicates facings for such front visible legs from which the indications of the gauge may be read. There are preferably provided set screws 66 or other means extending into the rear legs of the U-tubes thus provided, for the purpose of serving, as a means for regulating the position of the mercury within these U-tubes. By screwing the set screw 66 further into or out of the bores 56, the height of mercury therein may be regulated to correct the instrument.

Now referring to Figure 8, a modified construction is shown which may be employed in the gauge in place of the construction shown for gauges 15 and 14. In Figure 5, the bore 30ª connects with the bore 56ª which in turn connects with the vertical bore 60ª, connecting with the transparent tube 62ª. Within the bore 56ª, there is provided a tube 67 which encloses a further tube 68, which extends down near the bottom of the bore 56ª and leads up into a bore 66, which is connected with the pump line 12. In this form of the gauge, bore 30ª leads to the liquid contents to be measured, but does not connect directly with the pump. At the bottom of the tube 67 there is provided a small metallic ball 69 of insufficient diameter to close the tube 67, but large enough to close the tube 68. There is thus provided a check valve which will permit the passage of gas into the U-tube thus formed, but will operate positively against the return passage of such gas. When air enters through the tube 68, the ball is forced downwardly, away from said tube and the air bubbles up above the mercury in the tube 67 and out line 30ª, until a pressure is imposed upon the system equivalent to the head of liquid in the vessel connecting the bore 30ª. The passage of such air backward is prevented, since only on any tendency to reverse, the ball 69 seats against the tube 68. An air-tight seal is formed in consequence of this ball being emersed in mercury, the capillary action of which prevents it being forced upward in the tube and at the same time positively shuts off the return passage of air.

Now referring to Figure 8, the battery 36 which connects with the line 32 is indicated as having its different cells communicating through lines 70 with the line 32, and these lines 70 lead as far down into battery cells as the top of the plates. If in any cell there is insufficient acid to cover the plates, then the gas entering the line 32 will be immediately vented to the atmosphere and the gauge 13 connected therewith will fail to register any fluid in said battery. There is indicated a relief valve 71 in the line 32, which is formed by a T connecting with the U-tube, which, in Figure 9, is shown as provided with a small body 72 of mercury and with a small tube 73 in each of its legs into which the mercury may pass when it is forced up either leg. Thus, when the mercury is forced up into the leg to remove all of the mercury from the bottom of the U-tube, gas may pass by the mercury, through the annular space between the tubes 73 and the legs of the U-tube.

The line 34 which connects with the gauge 15 and the water supply system 38 is indicated as entering the water supply system in the top transfer hose 74 in which, in operation of the engine, the water is being circulated back to the radiator. In order that the indicating system will not be effected by the flow of the water, there is provided for the line 34, an orifice 75 facing away from the direction of flow of the water so that the pressure applied to the water by the pump of the system will be compensated for due to the suction action of the water passing the orifice.

A clamp 76 is indicated around the hose 74 at the orifice 75, so that by squeezing the hose 74, the gauge may be adjusted to that point where the suction action of the circulating water will just balance the increased pressure in the hose due to the action of the circulating pump.

The oil indicating gauge 12ª may be connected, like the other instruments, to a line leading to the point under the oil in the crankcase, so as to measure the oil by the head of oil above the point of entrance of the line, but preferably is shown disconnected from the pump and in place, connected by the line 31 with a capillary drain for the oil circulating system which operates a gauge by putting a pressure on line 31.

In Figure 8, 77 indicates the usual oil pump which works to take oil from the crankcase to line 78 and force the oil 79 through lines 80 to the bearings of the crankshaft and also through a check valve 81 to a line 82 over into the drain 83. In the drain 83, the oil passes down through a tube 84, back into the crankcase, the passage of oil placing a pressure on line 31. There is also preferably indicated a thermostatic arm 85 adapted, when heated, to close the top of the drain. In this manner, the gauge 12ª will fail to register whenever there is insufficient oil in the crankcase, or whenever the viscosity of said oil is insufficient to permit the pump 77 to put sufficient pressure on said oil to raise the check valve 81 or whenever the temperature of said oil becomes sufficiently high to cause the thermostatic arm to cover the drain 84.

There is also provided, in connection with the oil circulating system including pump 77, a line 96 leading to a further sylphon 97, which is intended to be normally expanded by the pressure of the oil undergoing circulation from pump 77. Whenever, due to insufficient oil supply or to excessive drop in viscosity of the oil, the pump 77 is inadequate to expand the sylphon 97, the sylphon 97 draws down against the arm 92, bending the arm 92 so that the gauge 12ª again ceases to function.

While the particular forms of apparatus for indicating the conditions of the various liquid supplies used in an internal combustion engine herein described are well adapted for carrying out the objects of the present invention, it is to be understood that various modifications and changes may be made without departing from the principles of this invention and this invention includes all such modifications and changes as come within the scope of the appended claims.

I claim:

1. A relief valve of the class described comprising a liquid holder, a tube into which said liquid may be forced by pressure, a side passage arranged in communication with said first tube but of such cross section that the capillary action of the liquid causes it to pass only into said tube, and means for limiting the upward motion of the liquid in said tube.

2. In a gauge of the class described, a body having a horizontal groove, a bore in said body communicating through a port with the top of said groove, an opening in the bottom of said body aligning with said port, and a U-tube extending through said bottom opening and into said port, one leg of said U-tube being tapered, and an elastic body in said port into which said tapered end of said tube is pressed.

3. A system of the class described including, a gauge, a line connecting such gauge with the water circulating system of an engine, means in said line providing an orifice adapted to compensate for the movement of water in said system.

4. A means of the class described, an air pressure gauge, a line connecting such gauge with the water circulating system of an engine, a pump for imposing pressure of said line, an orifice on said line arranged to compensate for the movement of water in said water circulating system, and a clamp at said orifice for regulating the return or passage of water by said orifice.

5. A means of the class described, the combination with an air pressure gauge pump, of a line connecting said pump with a gauge and having branch lines leading into the acid of the cells of a battery.

6. In a system of the class described, the combination of a gauge, means for imposing a pressure condition on said gauge in accordance with the rate of oil circulation in an engine, means for interrupting the indication of such gauge, and means actuating said last named means in accordance with the temperature of the oil being circulated.

7. In a system of the class described, a gauge, a line connecting such gauge with the oil system of an engine, a member actuated by the temperature of the oil of such system, and means connecting said member with such gauge line whereby said member is operative to cut off the indications of such gauge.

Signed at Los Angeles, California, this 1st day of Oct., 1928.

JAMES FRANCIS KEY.